United States Patent [19]

Dijken

[11] Patent Number: 4,978,878

[45] Date of Patent: Dec. 18, 1990

[54] ELECTRIC MULTIPOLAR MACHINE

[75] Inventor: Reinder H. Dijken, Groningen, Netherlands

[73] Assignee: U.S. Philips Corporation, New York, N.Y.

[21] Appl. No.: 368,488

[22] Filed: Jun. 19, 1989

[30] Foreign Application Priority Data

Jun. 27, 1988 [NL] Netherlands ............... 8801629

[51] Int. Cl.$^5$ ................................................. H02K 1/22
[52] U.S. Cl. ..................................... 310/268; 310/114; 310/154; 310/181
[58] Field of Search ........ 310/181, 67 R, 46, 40 MM, 310/268, 154, 114, 156, 49 R, 68 R, 266, 177

[56] References Cited

U.S. PATENT DOCUMENTS

| 3,469,134 | 9/1969 | Beyersdorf | 310/268 |
| 4,563,602 | 1/1986 | Nagasaka | 310/49 R |
| 4,658,166 | 4/1987 | Oudet | 310/268 |
| 4,682,067 | 7/1987 | Oudet | 310/268 |
| 4,745,312 | 5/1988 | Nagasaka | 310/181 |

FOREIGN PATENT DOCUMENTS

| 0230605 | 8/1987 | European Pat. Off. | |
| 2835210 | 2/1980 | Fed. Rep. of Germany. | |
| 0025044 | 7/1971 | Japan | 310/181 |

OTHER PUBLICATIONS

McGraw-Hill Dictionary of Scientific and Technical Terms, (no month) 1978, New York, N.Y. (pp. 332, 526).

Primary Examiner—R. Skudy
Attorney, Agent, or Firm—Bernard Tiegerman

[57] ABSTRACT

Electric multipolar machine, comprising a first machine part (1) with a magnetically soft outer element, a second machine part (3) arranged coaxially relative to the first machine part, with a magnetically soft inner element, provided with at least three teeth (17-19) and active coils (23, 24, 25), permanent magnets arranged in a circular path and ending in pole faces (31A1-A4, 31B1-B4, 31C1-C4), which mate with tooth faces (15A-H) across an air gap (35, 37), and a machine shaft (5), about which one of the abovementioned machine parts is rotatable relative to the other machine part. The outer element of the first machine part has at least one toothed magnetically soft disc-shaped plate (9, 11), which is provided with tooth faces distributed uniformly over the periphery of the plate. The magnets are disposed on the teeth of the second machine part, the pole faces being arranged in groups, with at least three groups of magnets being present, and the adjacent pole faces in each of the abovementioned groups having an opposite polarity. The pitch of the tooth faces, measured over a circle going through the tooth faces, is approximately twice the pitch of the pole faces in each of the abovementioned groups, measured over the same circle.

5 Claims, 2 Drawing Sheets

ELECTRIC MULTIPOLAR MACHINE

The invention relates to an electric multipolar machine of the electromagnetic type, comprising a first machine part with a magnetically soft first element, a second machine part arranged coaxially relative to the first machine part and with a magnetically soft second element, provided with at least three teeth and with active coils, permanent magnets arranged in a circular path and ending in pole faces which mate with tooth faces across an air gap, and a machine shaft about which the abovementioned machine parts are rotatable relative to each other.

Such a machine is known in the form of a small collectorless d.c. motor from German Patent Specification No. 28 35 210 . The known electric motor has a rotor which is provided with a bell-shaped outer element and a four-pole ring magnet bonded against the inside of the outer element. The stator of the known motor exhibits a laminated sheet plate with four radially directed T-shaped stator teeth, each provided with a curved tooth face which mates with the ring magnet across a cylindrical air gap. Active coils, connected in series in groups, are wound round the stator teeth, the current being passed in only one direction through the coils. In order to prevent dead positions of the rotor, facilities are present for generating a reluctance couple which gives the rotor preferred positions for starting.

A disadvantage of the known motor is that it has a layout with which only a limited specific power can be supplied.

The object of the invention is to produce an electric machine which is of such layout that, for a given speed and given dimensions, as a motor greater mechanical power or as a generator greater electric power can be supplied than is possible with the machine according to the state of the art.

The machine according to the invention is to that end characterized in that the first element of the first machine part has two parallel toothed magnetically soft disc-shaped plates, which are each provided with the tooth faces uniformly distributed over the periphery of the plate, the magnets are disposed on the teeth of the second machine part and are located between the two disc-shaped plates, the pole faces being arranged in groups, with at least three groups, spatially separated from each other, each of at least two magnets being distinguishable, while the number of groups of magnets is equal to the number of active coils, and the adjacent pole faces in each of the abovementioned groups have an opposite polarity, and the centre-to-centre distance of two successive tooth faces, measured along a hypothetical circular arc near the tooth faces, is at least virtually twice the centre-to-centre distance measured along the same circular arc between two neighbouring pole faces in each of the abovementioned groups, while the tangential dimension of the tooth faces is smaller than or equal to the corresponding dimension of the pole faces.

In order to clarify the design and operation of the machine according to the invention, a formula is shown below, in which the mechanical power of d.c. motors with permanent magnetic excitation is expressed in the most elementary parameters. Any reluctance contribution in the electromechanical couple is disregarded here. The formula concerned is: $P = 2.C.k_c.(c_f/r_o).\text{eff}.(1-\text{eff}).pp^2.N^2.(A.\phi^2/s)$.

P is the abovementioned mechanical power which is supplied by the electric motor. In this connection the term often used is electromechanical power, because conversion takes placed from a power in electrical form to a power in mechanical form.

C is a factor which has a value lower than 1. The factor C is the smaller the less constant the rotation voltage in the active coils during the time in which the electric current passes through the active coils, and the greater the deviation of the times of switching on and off of the current through the active coils from the most desired times. In this connection it is pointed out that the term active coils is understood to mean coils in which a rotation voltage is generated for the conversion of electric power to mechanical power. In the case of a generator the active coils are, of course, used to convert mechanical power to electric power.

$k_c$ is a commutation factor. The value of $k_c$ is 1, if electric currents are passed through the active coils in two directions. If the currents go through the active coils in only one direction, then $k_c$ has the value 0.5.

$c_f$ is a space factor, generally the copper space factor, of the active coils.

$r_o$ is the specific resistance of the material, generally copper, of the active coils.

eff is the electric power of the electric motor. The value will generally be in the region of 0.8.

N is a reference speed of rotation. It is understood to mean the speed at which the generated rotation voltage (E) in the active coils is equal to the voltage (U) of a connected supply source.

A is the area of that part of a cross-section intersecting the teeth, and directed at right angles to the motor shaft, which is taken up by the active coils. The way in which the coils are interconnected is not important here.

$\phi$ is that part of the magnetic flux supplied by the exciting elements which is the maximum that can be contained by each active coil. It is pointed out here that the abovementioned part in conjunction with the electric currents through the active coils forms the electromechanical couple and generates the rotation voltage in the active coils. If in this context there is talk of stray flux, it means the part of the flux supplied by the exciting elements which cannot be contained by the active coils.

pp is the number of complete to and fro movements of the part of the abovementioned flux contained by an active coil per revolution of one machine part relative to the other machine part.

s is the average length of the windings of the active coils, called the average winding length for short.

There are four important parameters in the formula given: the factor pp, the cross-section A, the average winding length s, and the flux $\phi$, pp and $\phi$ being in the form of the squares.

The electric machine according to the invention is of such a layout that the term $pp^2.A.\phi^2/s$ in the said formula can be relatively great, because the relevant parameters can be selected favourably relative to each other. For that reason the machine according to the invention can supply a high specific power.

In the electric machine according to the invention both the permanent magnets and the active coils are located in the same part of the machine,, preferably the stator. In a stator containing both the permanent magnets and the active coils the occurrence of any out-of-balance forces in the rotary part of the electric machine, the rotor, is countered, which can be seen as an additional, not insignificant advantage. The toothed magnetically soft disc-shaped plate can be manufactured accurately, for example by means of a mechanical operation such as punching-out of sheet steel, and as a rotary part therefore suffers hardly any adverse effects from out-of-balance forces. It is also pointed out that active coils forming part of the stationary part of an electric machine have an advantage as regards electronic commutation, because in that case no sliding contacts are needed.

The electric machine according to the invention is particularly suitable for use as a small motor, for example in electric razors. The electric machine as a motor design is also particularly suitable for driving, for example, fans and kitchen machines, while applications in audio and video equipment are also possible. An additional advantage of the electric machine according to the invention is that the bearing of the machine shaft suffers little or no effects from axially directed forces.

It is to be noted that European Patent Application No. 0,230,605 discloses a polyphase stepping motor which is provided with a laminated cylindrical stator body having a number of slots provided at a constant pitch in which coils are fitted. Mounted on the stator body is a thin magnetic ring having magnetic poles, which magnetic poles are arranged next to each other without any interuptions. The known stepping motor is furthermore provided with a rotor body having soft-magnetic teeth with tooth faces for magnetic interaction with the magnetic poles.

It is furthermore to be noted that U.S. Pat. Specification No. 4,563,602 (herewith incorporated by reference) discloses a stepping motor which has a cylindrical rotor provided with teeth radially directed outwards and a stator provided with teeth radially directed inwards. On the lastmentioned teeth there are fitted permanent magnets in a manner such that each of the teeth concerned is provided with a north pole or a south pole. The said U.S. Patent Specification furthermore shows a linear three-phase synchronous motor having a stator acting as inductor and a E-shaped armature. The stator is made up of magnetic and nonmagnetic strip-type parts which are placed alternatingly next to each other and are oriented with their longitudinal direction perpendicular to the direction of movement of the armature. The armature is provided with three (seen along the longitudinal direction of the said strip-type parts) limbs arranged behind each other which are each provided with a phase winding. Each of the limbs is furthermore provided, at its end facing the armature, with a permanent magnetic strip of a number of pole pairs.

An advantageous embodiment is characterized in that the tooth faces of the disc-shaped plates of the first machine part extend radially and tangentially, and the teeth of the second machine part are provided with at least three groups of magnets at two sides facing the disc-shaped plates of the first machine part, the magnets being axially magnetized.

The magnets located one above the other in the axial direction can be magnetized in pairs in the same direction or in opposite directions. In the former case the disc-shaped plates are rotated through such an angle relative to each other that the tooth faces of one plate are opposite the spaces between the tooth faces of the other plate. In the second case the tooth faces of the two abovementioned plates are opposite each other.

A sturdy little electric machine can be achieved with the embodiment which is characterized in that the disc-shaped plates of the first machine part each have eight tooth faces, and the second machine part has three teeth, each with four pole faces facing the one and four pole faces facing the other disc-shaped plate. With this number of pole and tooth faces the effect of stray flux in relation to the number of pole faces is restricted to a minimum, so that the arithmetical product of the number of changes of flux direction per revolution of the rotor and the maximum flux change is relatively great.

The invention will now be explained in greater detail by way of example, with reference to the drawing.

Figure 1:
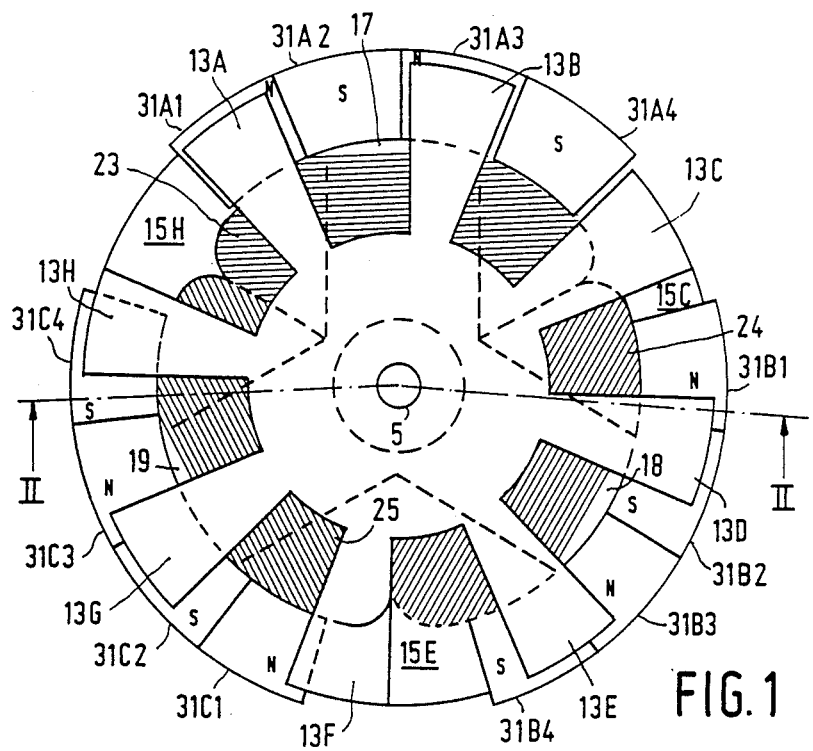
FIG. 1 is a schematic axial view of an embodiment of the electric machine according to the invention.

The electric machine according to FIGS. 1 to 4 is an electronically commutable small d.c. motor (electronic commutation is not shown in the drawings) with a rotor 1 and a stator 3. The rotor 1 is fixed on a motor shaft 5, which is rotatably mounted relative to the stator 3 by a bearing 7. The rotor has a magnetically soft first element, which is an outer element having two parallel magnetically soft disc-shaped plates 9 and 11. Each of the plates 9 and 11 is provided with eight tooth faces 13A to 13H and 15A to 15H respectively, uniformly distributed over the periphery of the plate. The tooth faces 13A to 13H and 15A to 15H are on the sides of the disc-shaped plates 9 and 11 which face each other. The two plates 9 and 11, which are identical to each other, are turned through an angle of 22.5° relative to each other, which causes the tooth faces of one plate to be positioned opposite the spaces between the successive tooth faces of the other plate. The plates 9 and 11 are made of a magnetically soft material, for example sheet steel or a ferrite, such as a ferrox cube.

Figure 2:
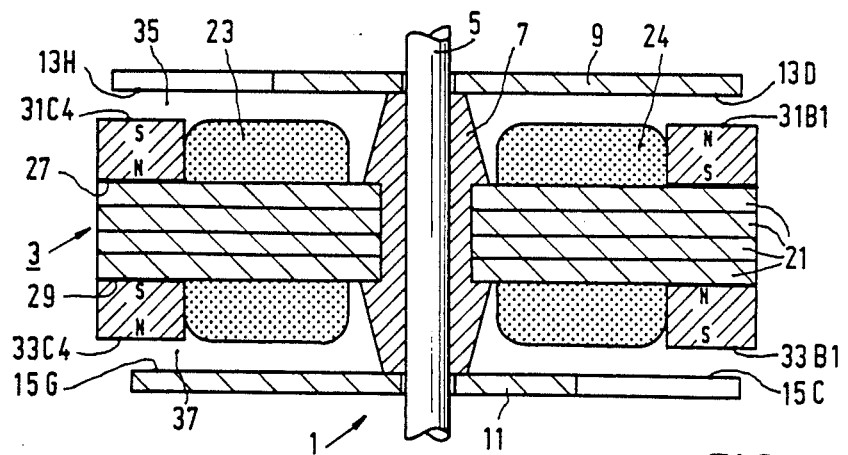
FIG. 2 is a cross section II—II of FIG. 1.

The stator 3 has a magnetically soft second element, which is an inner element having three teeth 17, 18 and 19 and made up of a number of laminations 21 of a magnetically soft material, for example sheet steel or a ferrox cube. An active coil 23, 24 and 25 is disposed round each of the teeth 17, 18 and 19. The teeth 17, 18 and 19 are between the plates 9 and 11, and are each provided with two north pole faces N and two south pole faces S at the side facing the plates 9 and 11. In the embodiment shown three spatially separated groups of magnets can be distinguished for this purpose on either side of the common teeth 17, 18 and 19. The magnets between the teeth 17, 18 and 19 and the disc-shaped plate 9, and the pole faces facing the tooth faces 13A to 13H are indicated by the numbers 31A1–A4, 31B1–B4, and 31C1–C4. The magnets between the teeth 17, 18 and 19 and the disc-shaped plate 11, and the pole faces facing the tooth faces 15A to 15H are indicated in the drawing by the numbers 33A1–A4, 33B1–B4 and 33C1–C4. As can be seen in FIG. 2, the magnetization direction of two magnets placed above one another is the same.

The permanent magnets 31A1–A4, 31B1–B4 and 31C1–C4, arranged in a circular path, mate at the tooth faces 13A to 13H with the magnetically soft plate 9 across an air gap 35, while the magnets 33A1–A4, 33B1–B4 and 33C1–C4 mate at the tooth faces 15A to 15H with the plate 11 across an air gap 37. Everything is dimensioned in such a way that in the situation shown in FIG. 1 the tooth faces 13A and 13B of plate 9 and the tooth faces 15A and 15B of the plate 11 are opposite the north pole faces 31A1 and 31A3 and the north pole faces 33A2 and 33A4 respectively. In the same situation the other tooth faces are largely opposite south pole faces. A flux, originating from the magnets 31A1 and 31A3 and the magnets 33A2 and 33A4, therefore runs via the magnetically soft plates 9, 11 to the magnets 31B2, 31B4, 31C2 and 31C4 and to the magnets 33B1, 33B3, 33C1 and 33C3 respectively, the flux returning to the plates 9 and 11 via the magnetically soft inner element, and being contained by the active coil 23. Such magnetic forces are exerted on the rotor 1 here that it is set in rotary motion. In the course of a complete rotation of the rotor 1 relative to the stator 3 the flux runs eight times in one and eight times in the other direction through the coil 23. Through the special layout of the motor, alternating fluxes also run through the other two coils 24 and 25, the fluxes being shifted in phase 120 electric degrees relative to each other by the three successive teeth 17, 18 and 19.

Figure 3:
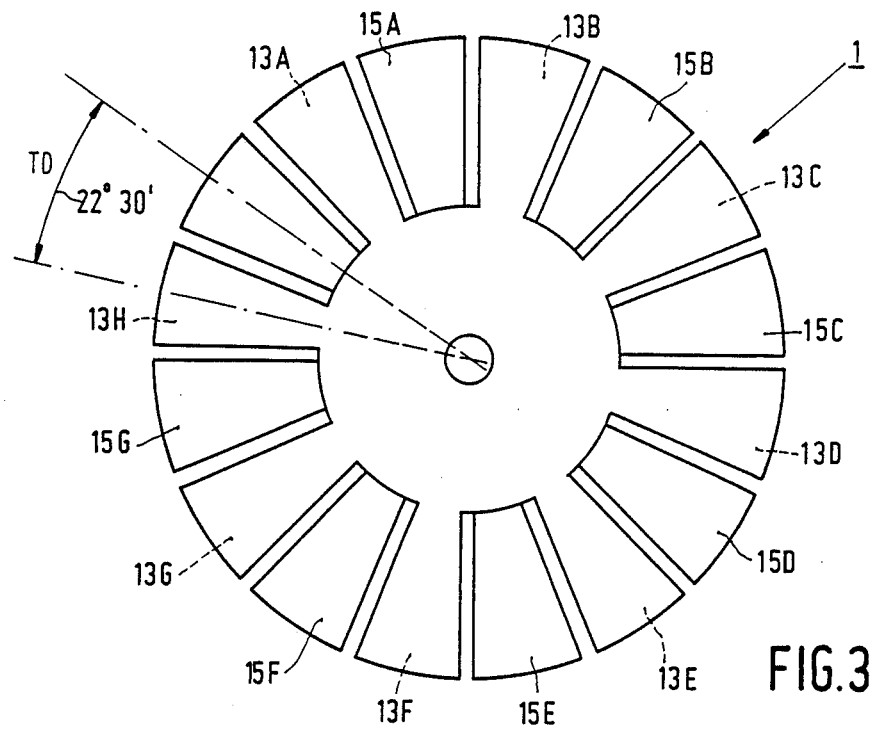
FIG. 3 is an axial view of the rotor of the electric machine of FIG. 1.
Figure 4:
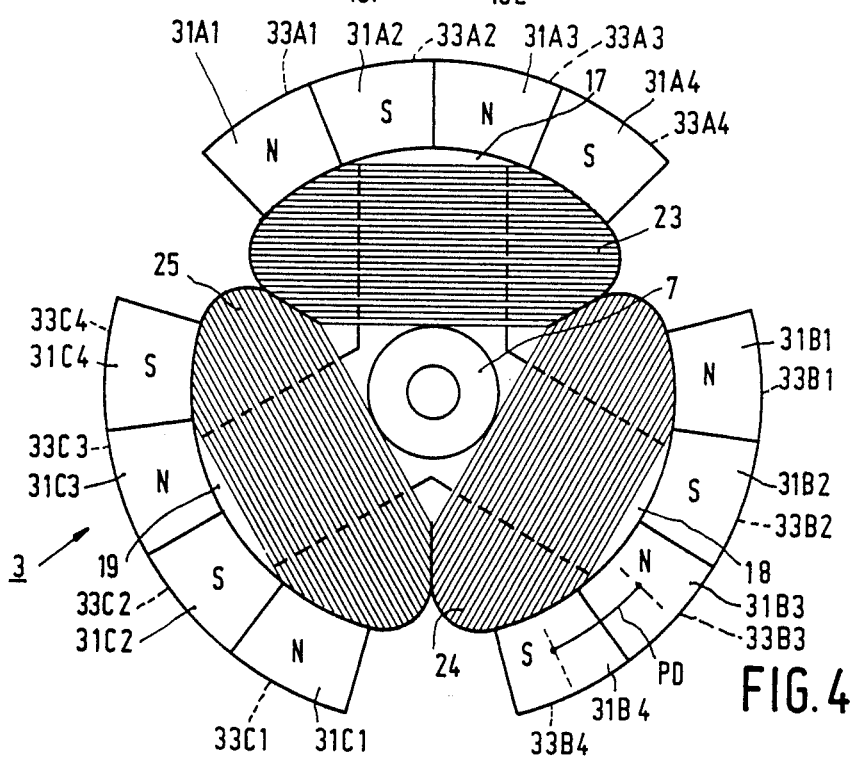
FIG. 4 is an axial view of the stator of the electric machine of FIG. 1.

FIG. 3 indicates by the letters TD the tooth face pitch, which means the centre-to-centre distance of two successive tooth faces, measured over the peripheral circle of the disc-shaped plates 9 and 11. The tooth face pitch in this embodiment is twice the centre-to-centre distance, measured over the same circle, of two neighbouring pole faces in each of the groups of magnets. The latter centre-to-centre distance or pole face pitch is indicated in FIG. 4 by the letters PD. The radially and tangentially extending tooth faces of the disc-shaped plates 9 and 11 are of such dimensions that they can intercept as great a part as possible of the flux emerging at the pole faces, so that as great a part as possible of the magnetic flux which can supply the exciting magnets can be contained by the active coils. The active coils 23, 24 and 25 can be connected to each other in a star connection or a delta connection. The active coils can, of course, also be excited separately.

Although the embodiment shown is advantageous from the power point of view, at least as regards the number of groups of magnets, the number of pole faces and the number of tooth faces, other advantageous embodiments are, of course, possible within the scope of the invention.

I claim:

1. Electric multipolar machine of the electromagnetic type, comprising:
    a first machine part with a magnetically soft first element,
    a second machine part arranged coaxially relative to the first machine part, with a magnetically soft second element, provided with at least three teeth and with active coils,
    permanent magnets arranged in a circular path and ending in pole faces which mate with tooth faces across an air gap, said pole faces and tooth faces being characterized by corresponding tangential dimensions, and
    a machine shaft about which the abovementioned machine parts are rotatable relative to each other, characterized in that the first element of the first machine part has two parallel toothed magnetically soft disc-shaped plates, which are each provided with said tooth faces uniformly distributed over the periphery of the plate, the magnets are disposed on the teeth of the second machine part and are located between the two disc-shaped plates, and pole faces being arranged in groups, with at least three groups, spatially separated from each other, each of at least two magnets being present, while the number of groups of magnets is equal to the number of active coils, and adjacent pole faces in each of the abovementioned groups have an opposite polarity, and the centre-to-centre distance of two successive tooth faces, measured along a circular arc situated near the tooth faces, is at least nearly twice the centre-to-centre distance measured along the same circular arc between two neighbouring pole faces in each of the abovementioned groups, while the tangential dimension of the tooth faces is smaller than or equal to the corresponding dimension of the pole faces.

2. Electric machine according to claim 1, characterized in that the tooth faces of the disc-shaped plates of the first machine part extend radially and tangentially, and the teeth of the second machine part are provided with at least three groups of magnets at two sides facing the disc-shaped plates of the first machine part, the magnets being axially magnetized.

3. Electric machine according to claim 2, characterized in that the disc-shaped plates of the first machine part each have eight tooth faces, and the second machine part has three teeth, each with four pole faces facing the one and four pole faces facing the other disc-shaped plate.

4. Electric machine according to claim 1, 2 or 3, characterized in that the first machine part is designed as a rotor and the second machine part as a stator.

5. Electric machine according to claim 1, 2 or 3, characterized in that the machine is an electronically commutatable d.c. motor.

* * * * *